US005787136A

United States Patent [19]
Miyazaki et al.

[11] Patent Number: 5,787,136
[45] Date of Patent: Jul. 28, 1998

[54] WEAR RESISTING SINTERED ALLOY AND ITS PRODUCTION, AND CONTROL ROD DRIVING APPARATUS AND NUCLEAR REACTOR USING THE SAME

[75] Inventors: Kunio Miyazaki; Jiro Kuniya, both of Hitachi; Masayoshi Kanno, Kitaibaraki; Masato Koshiishi, Takahagi; Tomomi Shiraki, Hitachi, all of Japan

[73] Assignee: Hitachi, Ltd., Tokyo, Japan

[21] Appl. No.: 744,195

[22] Filed: Nov. 5, 1996

[30] Foreign Application Priority Data

Nov. 6, 1995 [JP] Japan ................................. 7-287029

[51] Int. Cl.$^6$ .................................................... G21C 7/12
[52] U.S. Cl. ............................................. 376/219; 376/230
[58] Field of Search ................................. 376/219, 230, 376/245, 260

[56] References Cited

U.S. PATENT DOCUMENTS 3,830,694   8/1974   Acher ............................... 376/230

FOREIGN PATENT DOCUMENTS 58-23454   5/1983   Japan.
59-52228   12/1984   Japan.

*Primary Examiner*—Daniel D. Wasil
*Attorney, Agent, or Firm*—Antonelli, Terry, Stout & Kraus, LLP

[57] ABSTRACT

A wear resistant material containing no cobalt is used for a sliding portion of a control rod driving mechanism of a nuclear plant for reducing the exposure dose due to elution of cobalt and ensuring smooth driving of a control rod under a high load for a long time. A control rod driving mechanism employs a roller and a pin, each of which is made of a wear resisting alloy comprising coarse particles of a hard phase, having a particle size of from 20 to 100 µm, and dispersed in a soft matrix made of an iron-based or nickel-based alloy containing chromium and having a hardness of 300 Hv or less. A nuclear reactor employs this control rod driving mechanism.

17 Claims, 9 Drawing Sheets

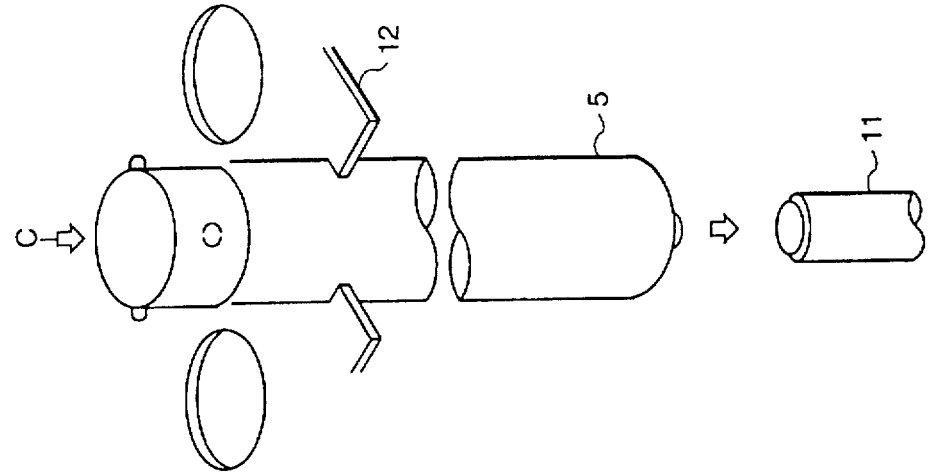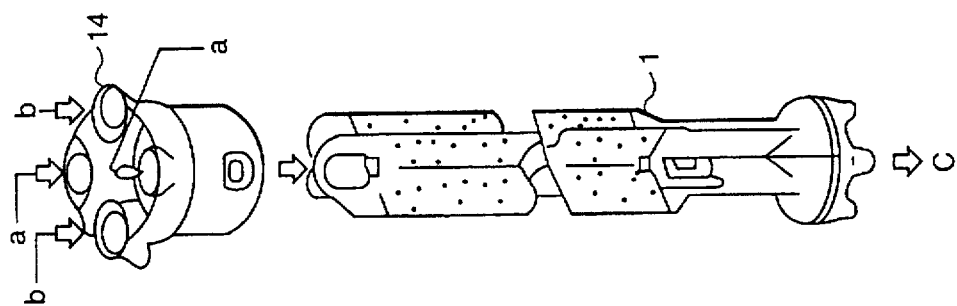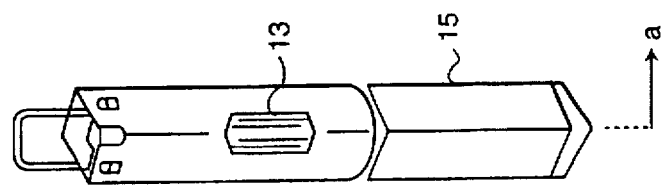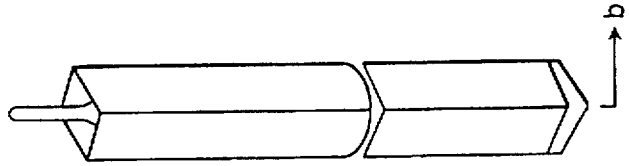

WEAR RESISTING SINTERED ALLOY AND ITS PRODUCTION, AND CONTROL ROD DRIVING APPARATUS AND NUCLEAR REACTOR USING THE SAME

BACKGROUND

The present invention relates to a wear resistant material having an excellent wear resistance, corrosion resistance and impact resistance, and particularly to a wear resistant alloy suitable for sliding members of the type used in a control rod driving apparatus of a nuclear reactor plant.

Cobalt-based alloys have been used for sliding members of a nuclear reactor plant. Specifically, a cobalt alloy called "stellite" has been employed to guide rollers or bushes for a control rod. This cobalt alloy contains 28–30 wt % of Cr, 2–2.5 wt % of C, and small amounts of W, Fe and Ni, the balance being Co. This alloy is excellent in corrosion resistance because of the high content of Cr, and also it is high in hardness because of the high content of C, leading to an excellent wear resistance.

A member made of such an alloy, however, presents a disadvantage when placed in reactor water at a high temperature and a high pressure. Namely, in this case, cobalt is eluted in the reactor water; the eluted cobalt adheres on the surface of a fuel sheath tube and is radio-activated; and the radio-activated cobalt is eluted again and circulated in the reactor water. As a result, the exposure dose is increased upon periodic inspection or repair of the plant, to extend the shutdown period, thus reducing the availability factor of the plant.

To prevent an increase the exposure dose due to elution of cobalt, it is necessary to use a different sliding material as a substitute for the cobalt-based alloy.

Japanese Patent Publication No. Sho 59-52228 has disclosed a sliding material not containing cobalt as a main component. Specifically, a nickel-based alloy is used as a roller material; however, since the alloy has a wear resistance lower than that of a cobalt-based alloy, it results in a large dimensional change due to wear and is poor in long-term service when used as a roller material for a sliding portion which is subjected to a high mechanical load. Also, Japanese Patent Publication No. Sho 58-23454 has disclosed a nickel-based alloy containing Cr and Nb; however, this alloy is poor in impact value and thereby low in reliability when subjected to an impact load at the time of a scram.

SUMMARY OF THE INVENTION

To solve the disadvantages of the conventionally used materials, the present invention has been made, and an object of the present invention is to provide a wear resisting alloy which is superior in wear resistance to stellite, high in reliability for an impact load due to high speed driving at the time of a scram, and low in exposure dose due to elimination of elution of cobalt, thereby ensuring a smooth driving of a reactor control rod using the alloy in high temperature water and at a high load for a long time. Another object of the present invention is to provide a method of producing the above alloy. A further object of the present invention is to provide a control rod driving apparatus and a nuclear reactor using the above alloy.

The present invention provides a wear resisting sintered alloy including an iron-based or nickel-based alloy forming a soft matrix and non-precipitated and non-crystallized hard particles dispersed in said soft matrix, wherein said hard particles are broken into fine particles by sliding wear and the fine particles are dispersed on the wear surface and also buried in said soft matrix.

The present invention also provides a wear resisting sintered alloy including a soft matrix having a hardness of from 100 to 300 Hv and hard particles, having an average particle size of from 10 to 120 µm, dispersed in said soft matrix in an amount of from 5 to 30 vol %.

The present invention also provides a wear resisting sintered alloy including an iron-based or nickel-based alloy containing chromium in an amount of from 15 to 30 wt % and hard particles, having a hardness of from 1000 to 2000 Hv, dispersed in said alloy.

The present invention also provides a wear resisting sintered alloy including an iron-based or nickel-based alloy containing chromium in an amount of from 15 to 30 wt % and hard particles, having an average particle size of from 10 to 120 µm, dispersed in said alloy.

The present invention also provides a wear resisting sintered alloy including an iron-based or nickel-based alloy containing chromium in an amount of 15 to 30 wt % and non-precipitated or non-crystallized particles of one or more kinds of carbides or nitrides, having a hardness of from 1000 to 2000 Hv, dispersed in said alloy.

The present invention also provides a wear resisting sintered alloy including an iron-based or nickel-based alloy containing chromium in an amount of 15 to 30 wt % and particles of one or more kinds of chromium carbides and chromium nitrides, having an average particle size of from 10 to 120 µm, dispersed in said alloy.

The present invention also provides a control rod driving apparatus including a housing, a hollow piston provided in said housing, a driving piston for vertically driving said hollow piston, rollers provided on a tube between said hollow piston and the tube provided in said housing, and pins functioning as rotating shafts of said rollers, wherein each of said rollers is made of any one of the above-described alloys.

The present invention also provides a control rod driving apparatus, wherein each of said roller and said pin is made of an iron-based or a nickel-based alloy having such a wear characteristic that the total wear amount of said roller and said pin is within a range of 10 mg or less per unit area (sliding width 7.5 mm×sliding distance 1 km) in a wear test performed under a load of 1 kg per sliding width of 0.75 mm in water at a high temperature of 288° C.

The present invention also provides a control rod driving apparatus, wherein said roller is made of an iron-based or a nickel-based alloy having such a wear characteristic that the wear amount of said roller is within a range of 8.5 mg or less per unit area (sliding width 7.5 mm×sliding distance 1 km) in a wear test relative to said pin performed under a load of 1 kg per sliding width of 0.75 mm in water at a high temperature of 288° C.

The present invention also provides a control rod driving apparatus, wherein said pin is made of an iron-based or a nickel-based alloy having such a wear characteristic that the wear amount of said pin is within a range of 4.5 mg or less per unit area (sliding width 7.5 mm×sliding distance 1 km) in a wear test relative to said roller performed under a load of 1 kg per sliding width of 0.75 mm in water at a high temperature of 288° C.

The present invention also provides a nuclear reactor including a pressure vessel, fuel assemblies provided in said pressure vessel, control rods provided among said fuel assemblies, and control rod driving apparatuses for individually driving said control rods, wherein said reactor has a burnup of 45 GWd/t or more, and a channel box forming the outermost peripheral portion of each of said fuel assemblies exhibits a bending amount of 0.8 mm or less per burnup of 8 GWd/t and also exhibits a bending amount of 2.8 mm or less at the burnup of 45 GWd/t; whereby said control rod driving apparatus can be used for 30 years or more without any replacement at an availability factor of 85% or more.

The present invention also provides a nuclear reactor including any of the above-described control rod driving apparatuses.

The present invention also provides a roller for a control rod driving apparatus, which is made of any of the above-described wear resisting sintered alloys.

The present invention also provides a method of producing a wear resisting sintered alloy, including the steps of: mixing a powder of an iron-based or a nickel alloy with a powder of a non-oxide hard material; and sintering the mixed powder by heating in combination with hot-pressing, thereby dispersing non-precipitated or non-crystallized hard particles in said alloy.

Additionally, the present invention provides a nuclear power plant of a type in which a steam turbine is rotated by thermal power obtained by atomic fuel contained in a reactor pressure vessel, and a generator is driven by rotation of the steam turbine, thereby obtaining an electric output, characterized in that the thermal power of the reactor is 3200 MW or more, the reactor pressure is 7.0 MPa or more, the temperature of reactor water is 288° C. or more, and the electric output is 1100 MW or more; and that at least one of a neutron source pipe, a core supporting plate, a neutron counter tube, a control rod insertion pipe, a shroud, and an upper grid plate can be used for 30 years or more without any replacement at a availability factor of 85% or more.

A control rod driving apparatus of a nuclear plant is changed from the conventional hydraulic driving type to a motor-driven type enabling fine adjustment. The new type control rod driving apparatus uses guide rollers for effecting smooth movement of a hollow piston. The guide roller is applied with a load very much larger than that applied to the guide roller used for the related art control rod, and thereby it requires a higher wear resistance.

In this roller, there occurs wear mainly on the inner peripheral surface of the roller and on the outer surface of a fixed pin for supporting the roller. More specifically, since the roller is slid on the pin in high temperature water without any lubrication, there occurs adhesive wear due to relative sliding movement between the roller and the pin. As to the adhesive wear, a shearing stress produced at the contact portion due to adhesion forms a plastic flow layer near the sliding surface. By repeated sliding, part of the plastic flow layer is finally broken and separated into a wear powder. Accordingly, to reduce the damage due to adhesive wear, it is necessary to impart a specified level or more of hardness or strength to the alloy for suppressing the plastic deformation at the contact portion. For this reason, a sliding member is made of an alloy in which a hard phase is precipitated or dispersed in a matrix for reinforcement of the strength by adjustment of a chemical composition of the alloy. When the hardness is excessively increased, the toughness is decreased and thereby the impact resistance is reduced, so that the chemical composition for the alloy must be suitably adjusted. The hard phase in the related art material is effective in terms of suppressing plastic deformation of the sliding surface and improving the wear resistance; however, it is not effective in terms of suppressing the most essential adhesion for the wear resistance. Specifically, the size of particles forming the hard phase of the related art material is relatively small, so that the surfaces of the particles forming the hard phase are easily covered with the metal forming a basic phase due to plastic flow. This exerts an adverse effect on the suppression of adhesion. Furthermore, since a guide roller in a control rod driving mechanism is used in high temperature water for a long time, the material used for the guide roller is additionally required to have an excellent corrosion resistance.

In view of the foregoing, the present invention has been made. Namely, the most important feature of the present invention lies in the fact that particles of a hard phase, having a particle size sufficiently large not to be perfectly covered by plastic flow, are suitably dispersed in a relatively soft matrix. These coarse particles of the hard phase not only suppress plastic flow, but prevent adhesion because they are exposed from the wear surface and thereby are not perfectly covered with the soft matrix by plastic flow. Another reason why coarse particles of a hard phase are dispersed is that when part of the sliding surface wear due to sliding with a mating material, the exposed portions of the coarse particles are finely broken and densely dispersed on the sliding surface and then buried in a relatively soft matrix, as a result of which a sliding surface stronger than that prior to the wearing is formed. In other words, the dispersion of the coarse particles of the hard phase in the soft matrix as fine particles results in a self-compensation function, to significantly improve the wear resistance. In this case, the particle size of the coarse particles of the hard phase made of a carbide, nitride or boride must be 20 μm or more for contributing to suppression of adhesion without being covered with the soft matrix due to plastic flow. In general, as the particle size of coarse particles of a hard phase become larger, the effect of suppressing the adhesion is increased. However, when the particles size is more than 100 μm, the effect is saturated and rather the impact characteristic is degraded. The dispersed amount of coarse particles of a hard phase is also an important factor of the present invention. When coarse particles of a hard phase are dispersed in a soft matrix in an amount of 5 vol % or more, the effect becomes significantly larger; while when they are dispersed in the matrix in an amount of 30 vol % or more, the wear amount is rather increased. For this reason, a preferable dispersed amount of coarse particles of a hard phase is in a range of from 5 to 30 vol %.

A basic phase contained in an alloy of the present invention requires a sufficiently soft hardness in order that finely broken particles of a hard phase are buried in the basic phase. It must be also selected in terms of corrosion resistance for high temperature water. As a result, a nickel-based or iron-based alloy containing Cr, which has a hardness of 300 Hv or less, is selected to form the above basic phase. When the Cr content is less than 15 wt %, the corrosion resistance in high temperature water is insufficient; while when it is more than 30 wt %, the toughness is rather reduced. Consequently, the Cr content is preferably in a range of from 15 to 30 wt %, more preferably, in a range of from 20 to 25 wt %.

C is an essential element for reinforcing the matrix. However, in order to ensure a soft matrix, the C content may be in a range of 0.05 to 0.005 wt %, more preferably, in a range of from 0.03 to 0.005 wt %.

Si is added to a deoxidizing agent used for producing an alloy powder. The Si content may be in a range of 1 wt % or less, preferably, in a range of from 0.05 to 0.5 wt %.

Mn has the same effect as that of Si. The Mn content may be in a range of 2 wt % or less, preferably, in a range of from 0.1 to 0.5 wt %. In addition, Mn and Si need not be added.

Al is added in an amount of 6 wt % or less for increasing the oxidation resistance and reinforcing the matrix. This element is preferably added to a Ni-based alloy.

Ni is added to a Fe-based alloy in an amount of 8–20 wt % to obtain an austenite stainless steel. The Fe content is preferably in a range of from 3 to 13 wt %.

Hard particles are dispersed in a sintered alloy in the form of a non-precipitated or non-crystallized phase, and preferably, they have a particle size sufficiently large to be broken upon sliding with a mating member on a sliding surface. In particular, an average particle size of the hard particles is preferably in a range of 10 to 200 μm, more preferably, in a range of 20 to 100 μm. The hard particles may be made of a non-oxide material because of its high adhesion with the matrix, preferably, made of a carbide, nitride or boride, more preferably, made of a carbide or nitride. When the hard particles have an excessively high hardness, they tend to accelerate wear of the mating material. Accordingly, the hardness of the hard particles may be in a range of 1000 to 2100 Hv, preferably, in a range of 1000 to 1550 Hv.

Specific examples of carbides include $B_4C$ (5000 Hv), SiC (4200 Hv), TiC (3200 Hv), ZrC (2800 Hv), VC (2100 Hv), NbC (2050)e, TaC (1550 Hv), $Cr_3C_2$ (1300 Hv), $Mo_2C$ (1500 Hv), and WC (1780 Hv). Of these carbides, those lower in hardness than VC (2100 Hv) are preferable. Specific examples of nitrides include $Si_3N_4$, AlN and $Cr_3N_2$, and specific examples of borides include $TiB_2$ (3370 Hv), $ZrB_2$, (2300 Hv), VB2 (2070 Hv), $CrB_2$ (1800 Hv), and $NbB_2$ (2200 Hv). Specific examples of suicides include $TiSi_2$ (870 Hv), ZrSi (1125 Hv), $VSi_2$ (1090 Hv), $Nb_5Si_2$ (1050 Hv), $TaSi_2$ (1563 Hv), $Cr_3Si_2$ (1280 Hv), $MoSi_2$ (1290 Hv), and $WSi_2$ (1090 Hv).

A Fe-based sintered alloy preferably includes a matrix having a stainless steel composition containing 0.05 wt % or less of C, 1 wt % or less of Si, 2 wt % or less of Mn, 15–30 wt % of Cr, and 18–20 wt % of Ni, and hard particles added to the matrix in an amount of from 5 to 30 vol %. More preferably, the content of each element is within the range specified as described above.

A Ni-based sintered alloy preferably includes a matrix having a composition containing 0.05 wt % or less of C, 1 wt % or less of Si, 2 wt % or less of Mn, and 15–30 wt % of Cr, and hard particles added to the matrix in an amount of from 5 to 30 vol %. In addition, preferably, the alloy forming the matrix further contains Al in an amount within the range specified as described above.

Each of a sheath tube, a spacer and a channel box according to the present invention, which is used in a condition of an average burnup of 45 GWd/t or more, is preferably made of a Zr-based alloy having a composition containing the following elements in specified amounts. A water rod is similarly made of the Zr-based alloy of the present invention; however, it may be made of zircaloy 2.

In the Zr-based alloy, when the Sn content is 1 wt % or less, the alloy cannot exhibit a sufficient corrosion resistance and strength. On the other hand, when the Sn content is more than 2 wt %, the effect is saturated and the machinability is reduced. As a result, the Sn content is specified to be in a range of 1 to 2 wt %, preferably, 1.2 to 1.7 wt %.

In the Zr-based alloy, Fe must be added in an amount of 0.02 wt % or more for increasing the corrosion resistance and the hydrogen absorption resistance. However,when the Fe content is more than 0.55 wt %, the effect is saturated and the machinability is reduced. As a result, the Fe content is specified to be in a range of 0.55 wt % or less, preferably, in a range of from 0.22 to 0.30 wt %.

In the Zr-based alloy, Ni is added in a small amount of 0.03 wt % or more for significantly increasing the corrosion resistance; however, it accelerates hydrogen absorption, resulting in embrittlement. For this reason, the Ni content is specified to be in a range of 0.16 wt % or less, preferably, in a range of from 0.05 to 0.10 wt %.

The Zr-based alloy of the present invention may contain Cr in an amount of from 0.05 to 0.15 wt %. The addition of Cr in an amount of 0.05 wt % or more is required for increasing the corrosion resistance and the strength; however, when the Cr content is more than 0.15 wt %, the machinability is reduced. As a result, the Cr content is specified to be in a range of 0.05 to 0.15 wt %.

The Zr-based alloy used for a fuel assembly of the present invention may be zircaloy 2 (Sn: 1.2–1.7 wt %, Fe: 0.07–0.20 wt %, Cr: 0.05–0.15 wt %, Ni: 0.03–0.08 wt %, the balance: substantially Zr) or zircaloy 4 (Sn: 1.2–1.7 wt %, Fe: 0.18–0.24 wt %, Ni: 0.007 wt %, the balance: substantially Zr). The fuel assembly using zircaloy 2 or zircaloy 4 is used in a condition of an average burnup of 45 GWd/t or less in combination with the above-described sheath tube, spacer and channel box, each of which is made of the Zr-based alloy of the present invention.

The sheath tube of the present invention is preferably fabricated by a method wherein after final hot-working, a Zr-based alloy is subjected to rapid cooling from a temperature range forming a (α+β) phase or a β phase, and then repeatedly subjected to cold-working and annealing. In particular, the rapid cooling from a temperature range forming a (α+β) phase is higher in workability in cold plastic working than the rapid cooling from a temperature range forming a β phase.

The alloy may be subjected to rapid cooling from a temperature range forming a (α+β) phase or a β phase until the final cold plastic working after the final hot plastic working, preferably, before the initial cold plastic working.

A temperature forming a (α+β) phase is in a range of from 790° to 950° C. and a temperature forming a α phase is in a range of from 950° to 1100° C. The rapid cooling from such a temperature is preferably performed using flow water or atomized water. In particular, the above rapid cooling may be performed before the initial cold plastic working, and in this case, it may be performed by locally heating by high frequency heating from the outer portion of a pipe material while allowing water to flow into the pipe material.

As a result, the inner surface of the pipe is not quenched and thereby it is high in ductility; while the outer surface of the pipe is quenched, and thereby it is high in corrosion resistance and hydrogen absorption coefficient. The heating of a pipe material for forming a (α+β) phase is preferably performed at such a temperature that a β phase is mainly formed. The α phase is not changed by rapid cooling and has a low hardness and a high ductility; while the β phase forms an acicular phase having a high hardness due to rapid cooling and it is low in workability in cold plastic working. On the other hand, the β phase mixed with the α phase even in a small amount exhibits a high workability in cold plastic working and is low in corrosion resistance and hydrogen absorption coefficient. It is desirable to heat a pipe material at such a temperature as to form the β phase at an area ratio of from 80 to 95% and to rapidly cool the pipe material from that temperature. The heating may be performed for a short time, for example, in a range of five minutes or less, preferably, in a range of five seconds to one minute. The long-term heating is undesirable because crystal grains grow and also precipitations are formed, degrading the corrosion resistance.

The annealing temperature after cold working may be in a range of from 500° to 700° C., preferably, in a range of from 550° to 640° C. The annealing temperature of 640° C. or less is effective to obtain a material having a high corrosion resistance. The heating for annealing is preferably performed in an Ar atmosphere or in high vacuum.The vacuum degree is preferably in a range of $10^{-4}$ to $10^{-5}$ Torr. It is desirable that the surface of the alloy is substantially formed with no oxide film and has colorless and metallic brightness. The annealing time is preferably in a range of from one to five hours.

A wear resisting alloy containing no cobalt according to the present invention can be used for a sliding member in a control rod driving apparatus. In this case, since the alloy eliminates elution of cobalt in the reactor water at a high temperature and at a high pressure, it is possible to suppress the exposure dose due to the induced radio-activation. Since the alloy is superior in wear resistance to stellite, the sliding member using the alloy exhibits only a small dimensional change due to wear, thus enabling precision driving. In addition, since the sliding member using the alloy is excellent in corrosion resistance and impact resistance, it is possible to ensure high reliability for long-term operation or high speed driving in case of an emergency.

BRIEF DESCRIPTION OF THE DRAWINGS

FIGS. 11 (A) to 11 (D) perspective views showing an assembly of a control rod driving mechanism, a fuel assembly, and a control rod.

DETAILED DESCRIPTION OF THE PREFERRED EMBODIMENTS

Figure 1:
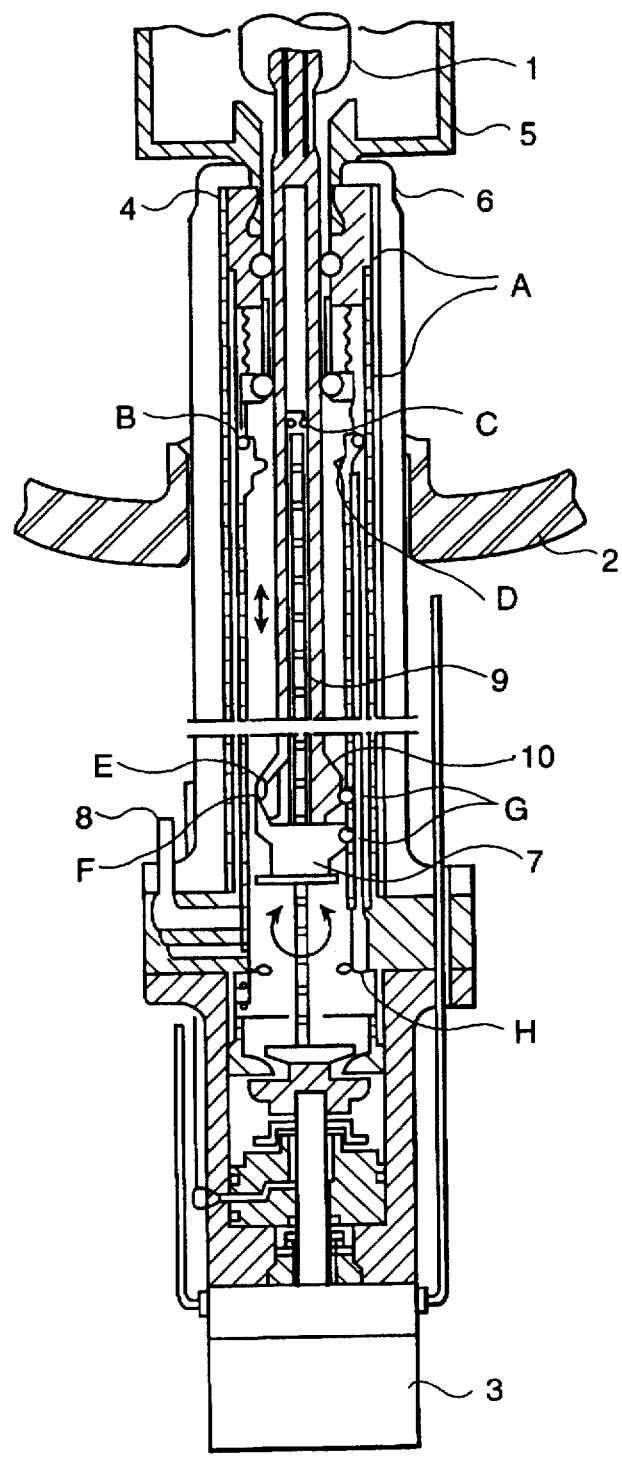
FIG. 1 is a sectional view of a control rod driving apparatus.

Various embodiments of the present invention will be described with reference to the drawings, wherein like elements in the respective views are denoted by the same reference numerals and characters.

EMBODIMENT 1

Table 1 shows chemical compositions of alloy powders used for sintered rollers subjected to a sliding wear test. Samples A1 to A6 are nickel alloy powders containing chromium in different amounts, and samples A7 to A12 are nickel alloy powders containing aluminum in different amounts. Each alloy powder was fabricated by atomization to have an average particle size of about 15 μm. This alloy powder was mixed with carbide particles or nitride particles. In this mixing, the particle size of carbide particles or nitride particles was changed and the content of carbide particles or nitride particles was also changed. The mixed powder was then sintered, in vacuum, by electric heating at about 1200° C. in combination with hot-pressing, to fabricate a roller material. The roller material thus obtained was then machined into a suitable size (outside diameter; 17 mm, inside diameter: 5.5 mm, and width: 7.5 mm). In addition, the void ratio of the sintered body was about 1%.

TABLE 1

(Roller)

| Sample | C | Si | Mn | Ni | Cr | Fe | Al |
|---|---|---|---|---|---|---|---|
| A1 | 0.02 | 0.5 | 0.5 | Bal | 9.5 | — | — |
| A2 | 0.02 | 0.5 | 0.5 | Bal | 15.2 | — | — |
| A3 | 0.02 | 0.5 | 0.5 | Bal | 20.7 | — | — |
| A4 | 0.02 | 0.5 | 0.5 | Bal | 25.5 | — | — |
| A5 | 0.02 | 0.5 | 0.5 | Bal | 30.5 | — | — |
| A6 | 0.02 | 0.5 | 0.5 | Bal | 35.5 | — | — |
| A7 | 0.02 | 0.5 | 0.5 | Bal | 20.5 | — | 0.9 |
| A8 | 0.02 | 0.5 | 0.5 | Bal | 20.5 | — | 1.9 |
| A9 | 0.02 | 0.5 | 0.5 | Bal | 20.5 | — | 2.9 |
| A10 | 0.02 | 0.5 | 0.5 | Bal | 20.5 | — | 4.1 |
| A11 | 0.02 | 0.5 | 0.5 | Bal | 20.5 | — | 5.0 |
| A12 | 0.02 | 0.5 | 0.5 | Bal | 20.5 | — | 5.9 |
| B1 | 0.03 | 0.5 | 0.5 | Bal | 10.2 | Bal | — |
| B2 | 0.03 | 0.5 | 0.5 | Bal | 14.9 | Bal | — |
| B3 | 0.03 | 0.5 | 0.5 | Bal | 20.0 | Bal | — |
| B4 | 0.03 | 0.5 | 0.5 | Bal | 25.2 | Bal | — |
| B5 | 0.03 | 0.5 | 0.5 | Bal | 30.5 | Bal | — |
| B6 | 0.03 | 0.5 | 0.5 | Bal | 30.5 | Bal | — |

Table 2 shows a chemical composition (wt %) of a mating pin material used for the sliding wear test. An ingot fabricated by atmospheric melting was subjected to hot-forging into a rod, and was then subjected to cold-working at a reduction ratio of 30%. The resultant rod was machined into a pin having a diameter of 5.5 mm. In addition, each roller was subjected to a sliding wear test in the as-sintered condition, and the average crystal grain size of the sintered roller was 30 μm.

For comparison with the alloys of the present invention, commercial cobalt-based alloys, stellite #3 (for roller) and Heinze #25 (for pin), were used.

TABLE 2

(Pin)

| | C | Si | Mn | Ni | Fe | Cr | V |
|---|---|---|---|---|---|---|---|
| C1 | 0.75 | 3.5 | 8.1 | 8.3 | Bal | 18.1 | 3.0 |

The sliding wear test was made by a method wherein a roller and a pin inserted in the roller were mounted on a tester, and the roller was pressed through the pin on a rotor made of a stainless steel (SUS316L) at a load of 10 kg in an environment simulating the operating condition of a nuclear reactor, that is, in water at a high temperature of 288° C.

Table 3 shows a relationship between a particle size of carbide particles and a wear amount for a sintered sample in which a $Cr_3C_2$ (chromium carbide) powder is used for formation of a hard phase and the nickel alloy powder containing 20 wt % of Cr (Sample No. A3 in Table 1) is used for formation of a basic phase. The wear test was repeatedly performed for sintered samples in which the particle size of the chromium carbide particles was variously changed. In this case, the content of the carbide particles was specified at 10 vol %. The condition of the wear test was as follows: the sliding speed was 0.03 cm/s and the running distance was 10 km. In addition,the wear amount was expressed in a weight reduction per 1 km. As shown in Table 3, when the size of the chromium carbide particle is more than 20–30 μm, the wear amount of each of the roller and the pin is significantly decreased, and particularly, becomes very much smaller than that of the related art cobalt-based alloy. On the other hand, when the size of the chromium carbide particles is more than 100 μm, the wear amount of each of the roller and the pin is slightly increased. As a result, the size of chromium carbide particles is preferably in a range of 20 to 100 μm.

TABLE 3

| No. | Roller material Alloy powder for matrix | Particle size of carbide (μm) | Pin material | Wear amount (mg/km) Roller | Pin | Total |
|---|---|---|---|---|---|---|
| 1 | A3 | 1 or less | Cl | 15.3 | 0.5 | 15.8 |
| 2 | A3 | 1–5 | Cl | 10.2 | 0.8 | 11.0 |
| 3 | A3 | 5–10 | Cl | 8.5 | 1.2 | 9.7 |
| 4 | A3 | 20–30 | Cl | 1.8 | 1.5 | 3.3 |
| 5 | A3 | 40–60 | Cl | 1.9 | 2.1 | 4.0 |
| 6 | A3 | 80–100 | Cl | 2.6 | 4.5 | 7.1 |
| 7 | A3 | 110–130 | Cl | 3.7 | 6.3 | 10.0 |
| 8 | B3 | 5 or less | Cl | 11.5 | 1.2 | 12.7 |
| 9 | B3 | 5–10 | Cl | 8.3 | 1.1 | 9.4 |
| 10 | B3 | 20–30 | Cl | 3.0 | 1.5 | 4.5 |
| 11 | B3 | 40–60 | Cl | 2.5 | 2.2 | 4.7 |
| 12 | B3 | 110–130 | Cl | 3.1 | 4.8 | 7.9 |
| 13 | Stellite #3 | — | Heinze #25 | 6.5 | 2.1 | 8.6 |

Figure 2:
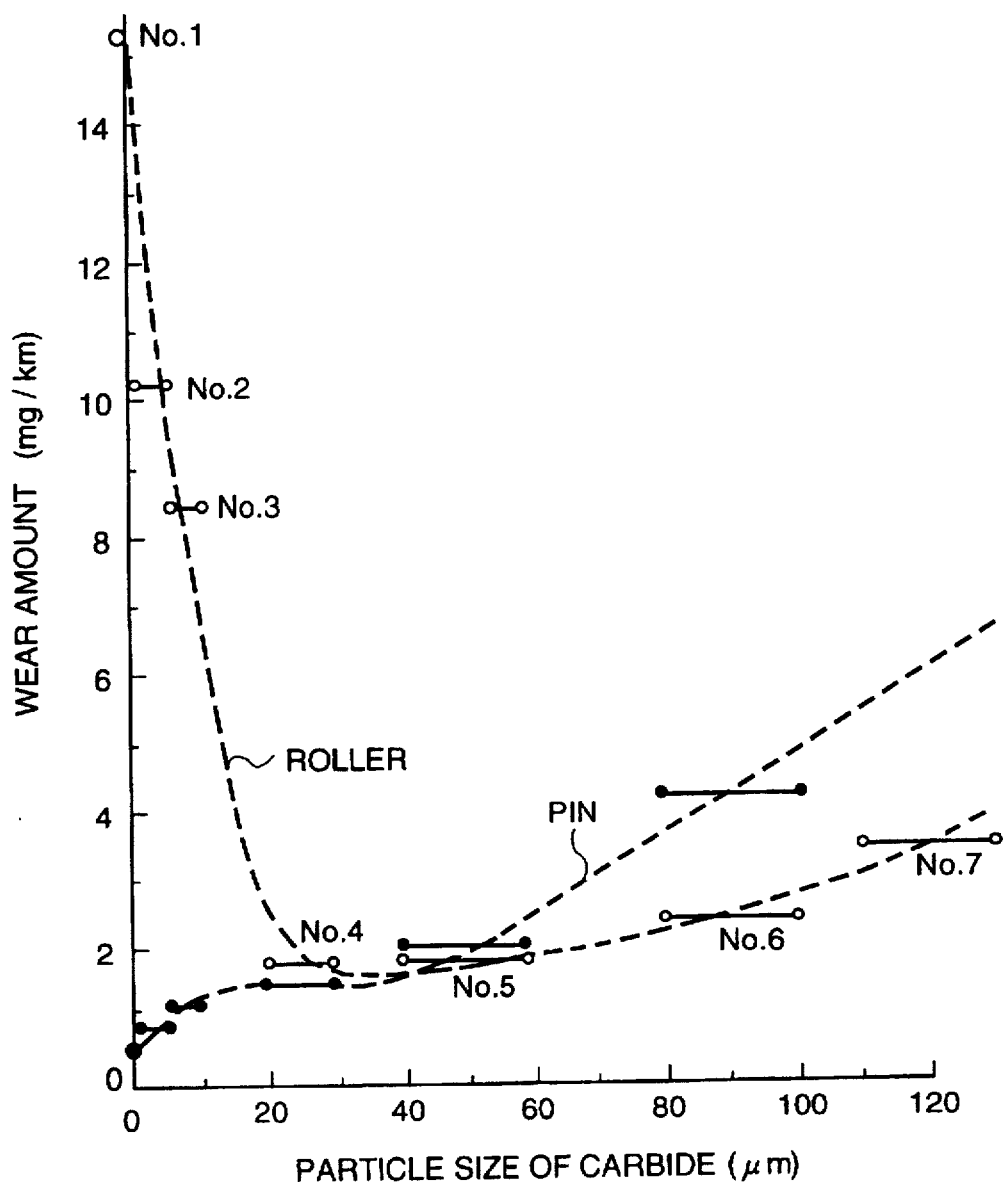
FIG. 2 is a diagram showing a relationship between wear amount and the particle size of carbide.

FIG. 2 is a diagram showing the above relationship between a particle size of carbide particles and wear amount. As shown in this graph, the roller made of a sintered body containing carbide particles having a particle size of from 15 to 120 μm exhibits a high wear resistance. On the other hand, with respect to the pin, the wear amount becomes larger with an increase in the particle size of carbide particles, and particularly, it becomes relatively rapidly larger when the average particle size exceeds 50 μm. In particular, it is revealed that the particle size of carbide particles for reducing the wear amounts of both the roller and the pin is in a range of from 15 to 80 μm, preferably, in a range of from 20 to 60 μm.

With respect to each of a roller and a pin made of a sintered body including a basic phase having an austenite stainless steel composition (shown in Table 3) and chromium carbides dispersed in the basic phase, the wear amount is large when the particle size of carbide particles is less than 5 μm; it is small when the particle size is in a range of from 10 to 100 μm; and it becomes large again when the particle size is more than 100 μm.

Table 4 shows the result of a wear test performed in the same manner as described above, except that the hard phase was made of a chromium nitride and the size of the nitride particles was changed. In this case, when the particle size of the nitride particles is in a range of from 20 to 100 μm, the wear amount becomes smaller, that is, the wear resistance is excellent as compared with the related art cobalt-based alloy. As can be seen from Table 4, it is revealed that the relationship between the size of nitride particles and the wear amount for the sintered body containing chromium nitride particles is substantially similar to that for the sintered body containing chromium carbide particles.

The total wear amount of the roller and the pin, each of which contains either chromium carbide particles or chromium nitride particles, is less than that of the roller and the pin, each of which is made of the related art cobalt-based alloy. In this case, the particle size of chromium carbide particles or chromium nitride particles is preferably in a range of 150 μm.

TABLE 4

| No. | Roller material Alloy powder for matrix | Particle size of carbide (μm) | Pin material | Wear amount (mg/km) Roller | Pin | Total |
|---|---|---|---|---|---|---|
| 1 | A3 | 1 or less | Cl | 16.3 | 0.6 | 16.9 |
| 2 | A3 | 1–5 | Cl | 12.8 | 1.0 | 13.8 |
| 3 | A3 | 5–10 | Cl | 10.2 | 1.2 | 11.4 |
| 4 | A3 | 20–30 | Cl | 4.5 | 1.8 | 6.3 |
| 5 | A3 | 40–60 | Cl | 3.8 | 2.6 | 6.4 |
| 6 | A3 | 80–100 | Cl | 3.6 | 4.1 | 7.7 |
| 7 | A3 | 110–130 | Cl | 4.6 | 7.0 | 11.6 |
| 8 | B3 | 5 or less | Cl | 11.8 | 1.2 | 13.0 |
| 9 | B3 | 5–10 | Cl | 10.2 | 1.0 | 11.2 |
| 10 | B3 | 20–30 | Cl | 4.3 | 1.0 | 5.3 |
| 11 | B3 | 40–60 | Cl | 3.7 | 2.5 | 6.2 |
| 12 | B3 | 110–130 | Cl | 4.4 | 4.5 | 8.9 |
| 13 | Stellite #3 | — | Heinze #25 | 6.5 | 2.1 | 8.6 |

Figure 3:
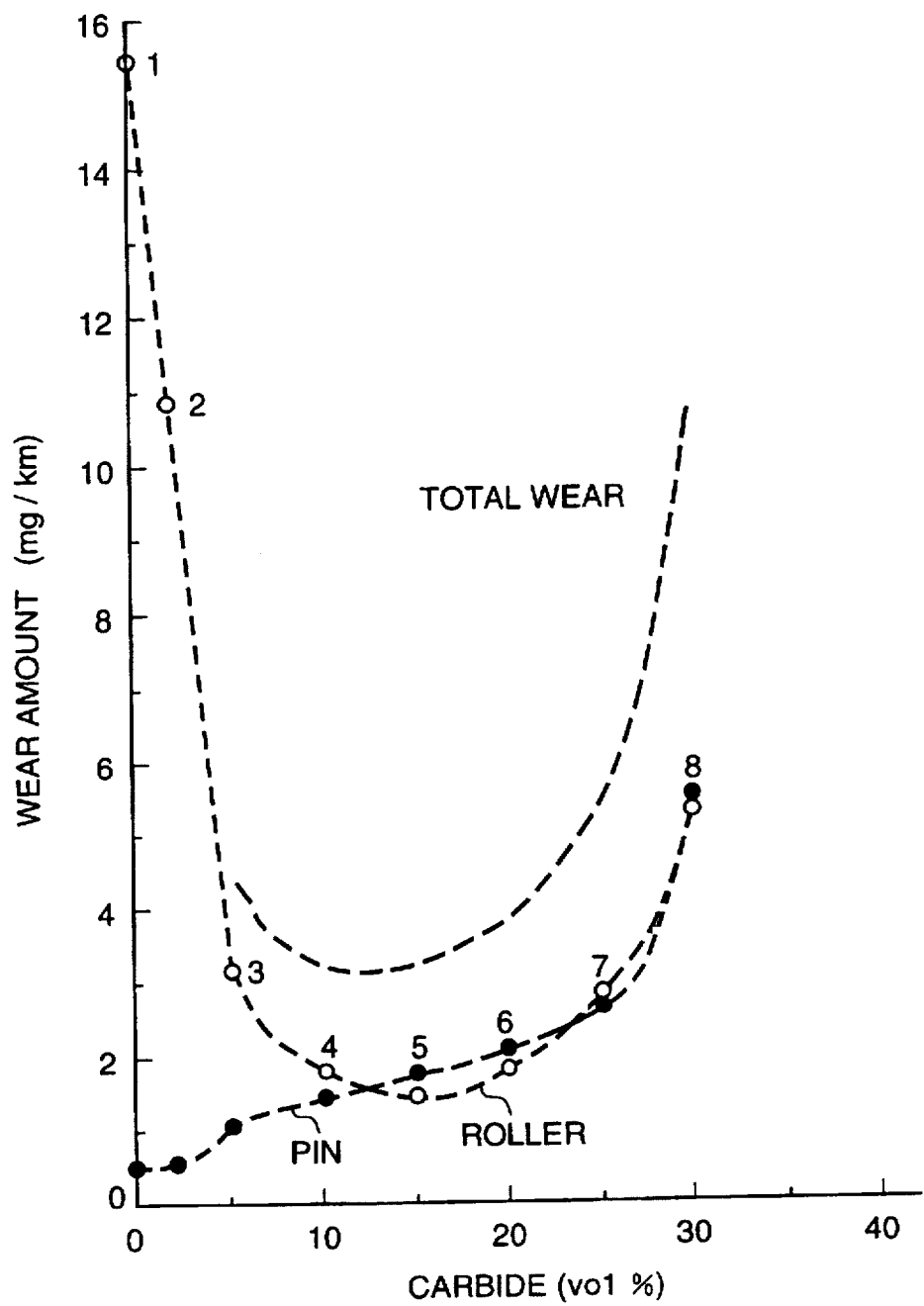
FIG. 3 is a diagram showing a relationship between a wear amount and a content of carbide.

Table 5 shows a relationship between the mixing ratio of chromium carbide particles and the wear amount for a sintered body using a mixed powder of the nickel alloy powder (A3) and a chromium carbide powder having a particle size of from 20 to 30 μm. The data in Table 3 are plotted in FIG. 3. As can be seen from Table 5 and FIG. 3, when the mixing ratio is 3 vol % or less, the additional effect of the coarse carbide particles is insufficient; and when the mixing ratio is more than 30 vol %, the wear amount is rather substantially increased because of the excessive content of the carbide particles. Accordingly, the mixing ratio of chromium carbide particles may be in a range from 5 to 30 vol %, preferably, in a range of from 5 to 25 vol %, more preferably, in a range of from 5 to 20 vol %.

TABLE 5

| | Volume ratio (%) of carbide in roller material | Wear amount (mg/km) Roller | Pin | Total |
|---|---|---|---|---|
| 1 | 0 | 15.3 | 0.5 | 15.8 |
| 2 | 2 | 10.8 | 0.5 | 11.3 |
| 3 | 5 | 3.2 | 1.1 | 4.3 |
| 4 | 10 | 1.8 | 1.5 | 3.3 |
| 5 | 15 | 1.5 | 1.8 | 3.3 |
| 6 | 20 | 1.9 | 2.2 | 4.1 |
| 7 | 25 | 2.9 | 2.8 | 5.7 |
| 8 | 30 | 5.5 | 5.6 | 11.1 |

Figure 4:
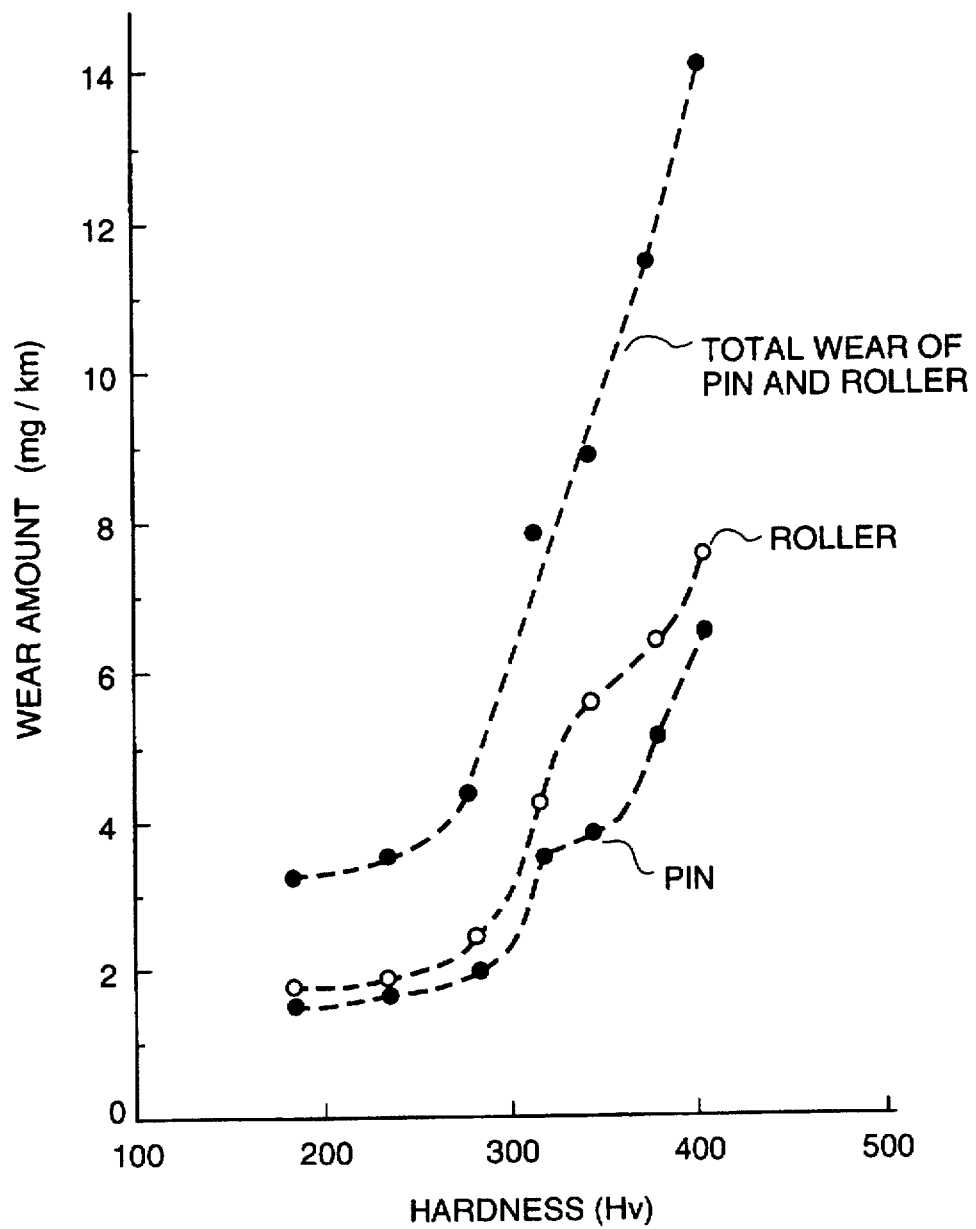
FIG. 4 is a diagram showing a relationship between wear amount and the Vickers Hardness.

Table 6 shows a relationship between the hardness of a basic phase and the wear amount. The data in Table 6 are plotted in FIG. 4. An atomized powder having the nickel alloy composition (A3) added with 6 wt % or less of Al was prepared, which was mixed with a chromium carbide powder having a particle size of 20 to 30 μm in a mixing ratio of 10 vol %. The mixed powder was sintered and then subjected to solution heat treatment at 1100° C. The sintered body thus obtained was further subjected to aging at 750° C. in such a manner that the precipitated amount of Ni3Al was changed for changing the hardness of the basic phase. As can be seen from Table 6 and FIG. 4, when the hardness of the basic phase is as small as about 200 Hv, the wear amount is small; and when it is more than 300 Hv, the wear amount becomes larger. In general, a wear amount of an alloy becomes smaller with an increase in hardness of the alloy (HOLM's law). The above relationship, however, is opposite to the general wear law due to the unique effect of coarse carbide particles. As a result of fine observation for the wear section of the roller after the wear test, it was recognized only for the sintered body containing the soft basic phase that chromium carbide particles were finely broken and buried in the wear surface. On the other hand, for the sintered body containing the basic phase having a hardness of 300 Hv or more, it may be considered that the carbide particles finely broken by frictional sliding and left on the sliding surface act as abrasive particles, leading to an increased wear amount.

TABLE 6

| Content (wt %) of Al in Ni alloy powder | Hardness (Hv) of matrix alloy after heat treatment | Wear amount (mg/km) | | |
|---|---|---|---|---|
| | | Roller | Pin | Total |
| 1 | 0 | 185 | 1.8 | 1.5 | 3.3 |
| 2 | 2 | 237 | 1.8 | 1.7 | 3.5 |
| 3 | 5 | 286 | 2.5 | 2.0 | 4.5 |
| 4 | 10 | 321 | 4.3 | 3.6 | 7.9 |
| 5 | 15 | 352 | 5.1 | 3.8 | 8.9 |
| 6 | 20 | 385 | 6.4 | 5.1 | 11.5 |
| 7 | 25 | 415 | 7.6 | 6.5 | 14.1 |

Table 7 shows a corrosion reduction of a sintered alloy left for 3000 hours in high temperature water (288° C.) containing 8 ppm of dissolved oxygen. In this test, the sintered alloy of the present invention containing 15 wt % or more of Cr exhibits a corrosion reduction less than that of stellite, that is, it has an excellent corrosion resistance. When the Cr content is more than 30%, the effect exerted on the corrosion reduction is saturated.

TABLE 7

| No. | Content (wt %) of Cr in Ni alloy powder | Corrosion reduction (mg/cm$^2$) of roller material in high temperature water |
|---|---|---|
| 1 | 5 | 3.2 |
| 2 | 10 | 1.9 |
| 3 | 15 | 0.8 |
| 4 | 20 | 0.6 |
| 5 | 25 | 0.5 |
| 6 | 30 | 0.5 |
| 7 | Stellite #3 | 1.2 |

Table 8 shows a result of examining the toughness of a roller material of the present invention by Sharpy impact test. The roller material of the present invention has a very much higher in impact value than stellite.

TABLE 8

| Roller material | hard phase | size (μm) of particles in hard phase | Volume ratio | V-notch Charpy impact value (kg-m/cm$^2$) |
|---|---|---|---|---|
| A3 (Ni-based) | Chromium carbide | 20–30 | 10 | 2.5 |
| B3 (Fe-based) | Chromium nitride | 20–30 | 10 | 1.7 |
| Stellite #3 | | | | 0.2 |

EMBODIMENT 2

Figure 5:
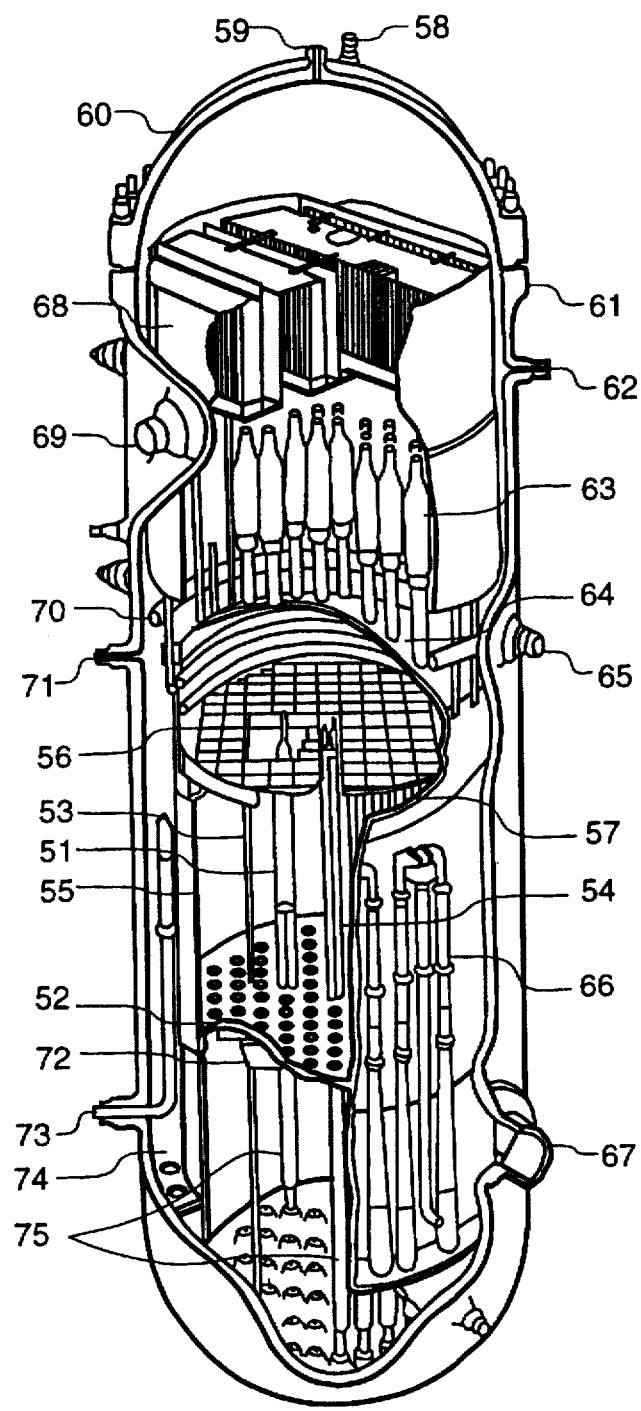
FIG. 5 is a perspective view, partly in section, of a nuclear reactor.

FIG. 5 is a partial sectional view of a core of a boiling water reactor.

The reactor in this embodiment is operated at a steam temperature of 286° C. and at a steam pressure of 70.7 atm, and it can output powers of 500, 800, and 1100 MW. In this reactor, the core includes a neutron source pipe 51, a core supporting plate 52, a neutron counter tube 53, control rods 54, a core shroud 55, an upper grid plate 56, fuel assemblies 57, a spray nozzle 58 provided on an end plate, a vented nozzle 59, a pressure vessel cover 60, a flange 61, a measuring nozzle 62, a steam separator 63, a shroud head 64, an inlet nozzle 65 for feed water, a jet pump 66, a steam drier 68, an outlet nozzle 69 for steam, a spar jar 70 for feed water, a nozzle 71 for core spray, a lower core grid 72, an inlet nozzle 73 for recirculation of water, a baffle plate 74, and control rod guide pipes 75.

The upper grid plate 56 has a rim barrel, flanges and grid plates, each of which is formed of a rolled plate made of a polycrystalline stainless steel (SUS316). The grid plates only cross and are not fixed to each other. The core supporting plate 52 is also formed of one rolled plate made of the polycrystalline stainless steel (SUS316), and it has holes for mounting fuel fixtures and is fixed at its circumferential surface to the reactor vessel. Accordingly, neither the upper grid plate 56 nor the core supporting plate 52 has any welded portion at the center portion receiving neutron irradiation.

FIG. 1 is a sectional view of a control rod driving mechanism enabling fine adjustment of a control rod 1 by an electric motor 3. A roller of the present invention, used for the control rod driving mechanism, was fabricated by sintering a mixed powder of the nickel alloy powder containing 25 wt % of Cr (Sample A4 in Table 1) and chromium carbide (Cr3C2) particles having a particle size of 20–30 μm at a mixing ratio of 10 vol %, in the same manner as that in Embodiment 1. The pin shown in Table 2 was also fabricated in the same manner as in Embodiment 1. Thus, 32 sets of these rollers and the pins were subjected to a load driving test equivalent to the practical load driving for 40 years in an environment simulating that of a real reactor, that is, in circulated water at a high temperature. As a result, each of the roller and the pin exhibited a dimensional change due to wear, which was small enough to satisfy a design basis, and resulted in no breakage caused by an impact load applied upon scram driving.

The control rod driving mechanism in this embodiment is so configurated that the control rod 1 is vertically driven, through a hollow piston 4, by a driving piston 7 moved by means of a piston driving screw 9 rotated by a motor 3. The control rod driving mechanism is welded to a nuclear pressure vessel 2. The control rod 1 is driven in a control rod guide pipe 5. A hydraulic driving piston 10 is used for rapidly lifting up the control rod 1 by insertion of water from a water insertion piping 8 in case of emergency, and it is separated from the driving piston 7. In particular, since each member of the control rod mechanism is in contact with high temperature water, it is made of a stainless steel (SUS316L). The control rod 1 has a structure dropped by its dead weight.

A set of the roller and the pin in this embodiment are disposed at each of portions A to H between the hollow piston 4 and each tube provided in a housing 6 for the purpose of smooth movement of the hollow piston 4. The portion A is a buffer portion. Four pieces of the buffer portion A are spaced at intervals of 90° for each of upper and lower sides. The portion B is a stop piston portion; portion C is a spindle head portion; portion D is a ball screw upper portion; portion E is a latch supporting portion; F is a latch outer surface portion, and portion G is a hollow piston/ball nut portion. With respect to each of the portions A to G, four pieces are disposed for each of the upper and lower sides.

The portion H is a middle flange portion. Six pieces of the middle flange portion H are provided along the circumference. The shapes of the roller and the pin used for each portion are as follows.

Figure 6:
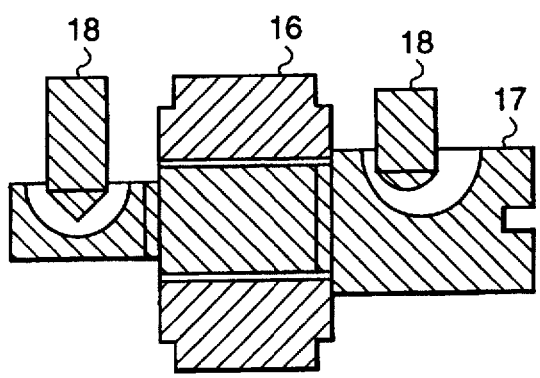
FIG. 6 is a sectional view of a pin and a roller.

FIG. 6 is a sectional view showing a roller 16 provided at the portion A and a pin 17 inserted in the roller 16. The pin 17 is restricted in rotation by pressing pins 18. The pin 17 has a large diameter portion, an intermediate diameter portion, and a small diameter portion. The roller 18 has an inner peripheral portion (pin insertion portion) having a large thickness and an outer peripheral portion having a relatively small thickness.

Figure 7:
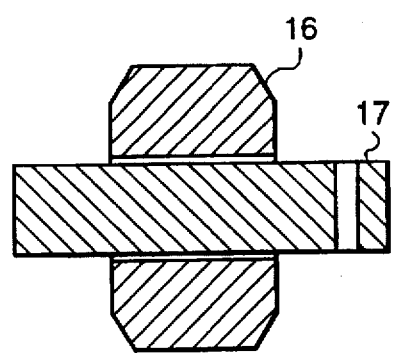
FIG. 7 is a sectional view of a pin and a roller.
Figure 8:
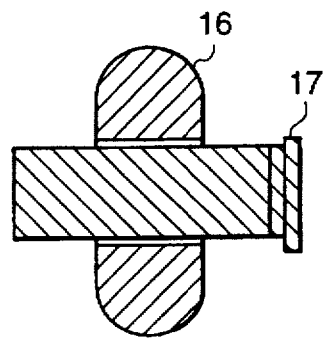
FIG. 8 is a sectional view of a pin and a roller.

FIG. 7 is a sectional view showing a roller 16 provided on the outer side of the portion C and a pin 17 inserted in the roller 16, and FIG. 8 is a sectional view of a roller 16, having a similar oval shape in section, provided on the inner side of the portion C and a pin 17 inserted in the roller 16. A set of a roller and a pin, each of which has a structure similar to that shown in FIG. 6, are provided at the portion D, wherein the pin 17 has a head portion having a large diameter, which linearly extends up to the surface, opposite to the head portion, of a pin insertion portion of the roller.

Figure 9:
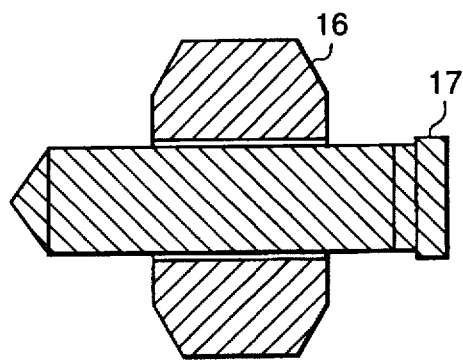
FIG. 9 is a sectional view of a pin and a roller.
Figure 10:
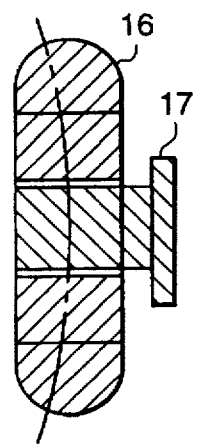
FIG. 10 is a sectional view of a pin and a roller.

FIG. 9 shows a set of a roller 16 and a pin 17 provided at the portion G, and FIG. 10 is a set of a roller 16 and a pin 17 provided at the portion H. The former uses a ball nut roller/pin, in which the pin 17 has a leading end formed in a cone shape and a head portion having a diameter slightly larger than that of the pin insertion portion of the roller.

FIGS. 11(A) to 11(D) show an arrangement for assembly of the control rod 1 driven by the control rod driving mechanism 11, the fuel assemblies (A) and (B), a center fuel supporting fixture 14, and a core supporting plate 12. FIG. 11(A) shows the fuel assembly having no handle which is arranged at a portion "b" in FIG. 11(C); and FIG. 11(B) shows the fuel assembly having a handle which is arranged at a position "a" in FIG. 11(C). The supporting fixture 14 for supporting the fuel assemblies is brought in contact with the core supporting plate 12 and fixed thereto.

In this embodiment, the alloy No. 5 shown in Table 1 was used for a sheath, B4C tube or Hf tube of the control rod 1. Each of the B4C and Hf tubes was fabricated by repeatedly performing cold-rolling and annealing for a raw tube prepared by hot-rolling using a Pilger rolling mill. The sheath was fabricated by repeatedly performing cold-rolling and annealing for a raw plate, and forming a sheath by welding the sheet thus obtained.

Figure 12:
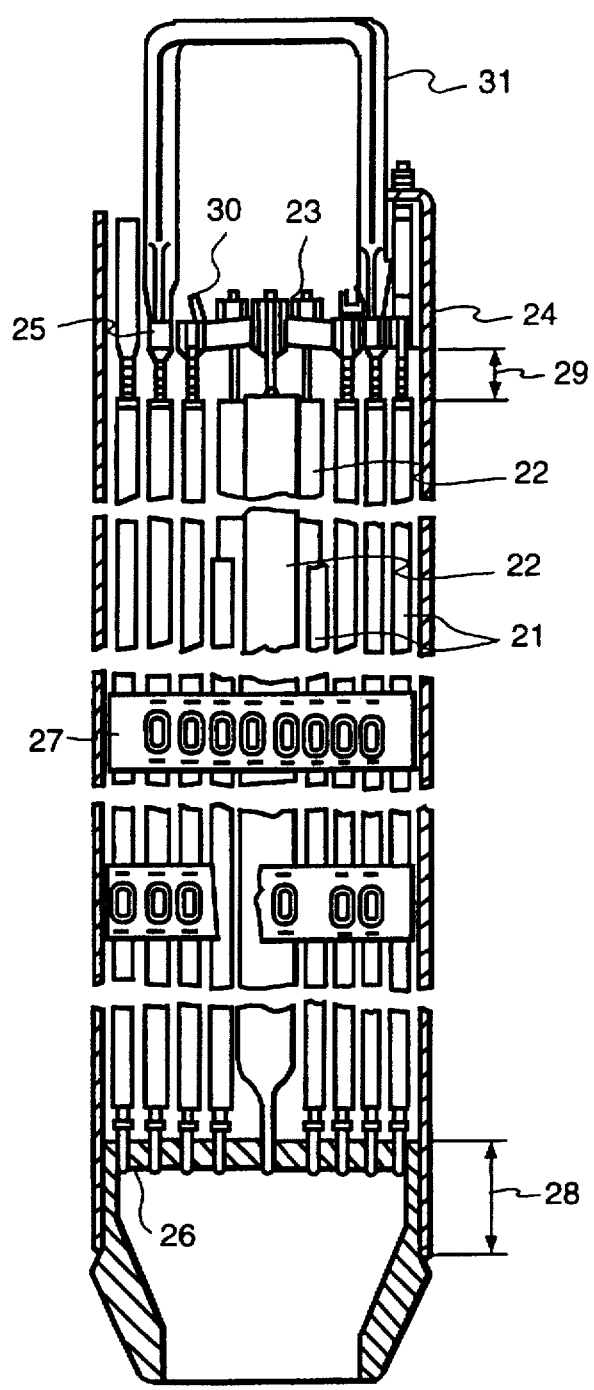
FIG. 12 is a sectional view of a fuel assembly.

FIG. 12 is a sectional view of a fuel assembly of the present invention which is used for a boiling water reactor.

As shown in FIG. 12, the BWR fuel assembly includes a plurality of fuel rods 21, multi-steps of spacers 27 for holding the fuel rods at specified intervals, a square tube shaped channel box 24 for containing them, upper tie plates 25 and lower tie plates 26 for holding both the ends of the fuel rods 21, each having fuel pellets contained in a fuel sheath, water rods 22 disposed at the center of the spacers, and a handle 31 for carrying the entire fuel assembly. In addition, the fuel assembly is fabricated in accordance with known processes.

The channel box 24 contains the fuel rods integrated by the spacers 27 and the water rods 22, and it is fixed to the upper tie plates 25 and the lower tie plates 26 by means of the water rods 22. The channel box 24 is formed into a square tube shape by joining two pieces of U-shaped plates (length: 4 m; thickness: 80, 100, 120 mm) to each other by plasma welding. The channel box 24 acts to rectify both steam generated on the surfaces of the fuel rods and high temperature water flowing between the fuel rods upon operation of the plant, and to forcibly introduce them upward. The channel box 24 is operated for a long time in such a state as to be subjected to a stress spreading the square tube outward because the inner pressure is slightly higher than the outer pressure.

In the fuel assembly of the present invention, three water rods 22 are disposed symmetrically with respect to the center of the spacers 27, each of which is fixed at both the ends to the tie plates by means of screws, and the channel box 24 is fixed on the upper tie plates 25 by means of screws. Accordingly, the fuel assembly can be integrally carried using the handle 31. In this embodiment, each fuel rod is not fixed on the tie plates.

The channel box is preferably subjected to the heat treatment described above in such a manner that the orientation ratio (Fr value) in the plate thickness direction (the crystal orientation <0001>) is in a range of 0.25 to 0.6; the orientation ratio (Fl) in the longitudinal direction is in a range of from 0.25 to 0.4; and the orientation ratio (Ft) in the lateral direction is in a range of from 0.25 to 0.4. Preferably, Fr is in a range of from 0.25 to 0.5; Fl is in a range of from 0.25 to 0.36; and Ft is in a range of from 0.25 to 0.36. By such a crystal orientation due to heat treatment, an average grain size of $\beta$ Zr crystals is in a range of from 50 to 300 μm (preferably, in a range of 100 to 200 μm). This is effective to significantly prevent elongation due to irradiation and eliminate occurrence of bending, and hence to prevent interference between the channel box and the control rod. As a result, the channel box can be used even in a condition of a burnup of 45 GWd/t or more (for example, 60 GWd/t) or even in the case being disposed near the periphery, without any problem. Furthermore, the channel box can be used for the conventional burnup 32 GWd/t with fuels being replaced.

In particular, for the related art channel box material having Fr of 0.67, Fl of 0.11 and Fr of 0.22, the bending at the outermost periphery is 0.9 mm per year (burnup: 8 GWd/t), and it becomes 0.8 mm for Fr of 0.6; 0.45 mm for Fr of 0.5; and 0.15 mm for Fr of 0.4. Accordingly, for a burnup of 45 GWd/t, the related art material having Fr of 0.67 cannot be prevented from interfering with the control rod by the bending generated at the outer periphery for one year and by the bending generated at the center portion for 4.5 years. On the other hand, for a material having Fr of 0.6, the interference can be prevented even by the bending generated at the outermost periphery for one year and even by the bending generated at the center portion for 4.5 years. For a material having Fr of 0.5, the interference can be prevented even by the bending generated at the outermost periphery for 4 years and even by the bending generated at the center portion for 1.5 years. And, for a material having Fr of 0.4 or less, the interference can be perfectly prevented even by the bending generated at the outermost periphery for 5.5 years.

The channel box was fabricated by the steps of preparing a plate made of a Zr-based alloy shown in Table 9, cold-bending the plate into a U-shaped member having a length of 4 m, and joining two U-shaped members to each other by laser or plasma welding, thereby obtaining a square tube 12. The irregularities at the welded portions were flattened. The square tube was heated in a $\beta$ phase forming temperature range by high frequency induction heating and then rapidly cooled using cooling water sprayed from a nozzle provided directly under a high frequency induction heating coil. The square tube was allowed to pass through the heating coil from top to down at a specified speed, thus completing the entire heat treatment. The feed speed of the square tube and the output of the high frequency power supply were set such that the heating temperature was 1100° C. and the holding time over 980° C. was ten seconds or more. The square tube may be heated in a range of from 1000° to 1200° C., and preferably, it may be held in a temperature range of from 1050° to 1100° C. for a time of from 3 to 10 seconds.

After heat treatment, the square tube was cut into test pieces each having a size (width: 40 mm, length: 40 mm) for measurement of the F values. The result is shown in Table 10. The heat treatment parameter (P) is 1.96. The heat treatment was performed with the square tube fixed on a mandrel made of an austenite stainless steel at both the ends by means of screws. As can be seen from Table 10, for the (0002) face (bottom plane of a hexagonal column) and the (1010) face (side plane of the hexagonal column), each of the Fr, Fl and Ft becomes substantial ⅓, which exhibits the perfectly random crystal orientation. The average size of β Zr crystal grains was about 100 μm. After the heat treatment, the square tube was formed at a high dimensional accuracy, followed by sand blasting and acid pickling for removing a surface oxide film, and was then subjected to autoclave processing using steam after removal of the surface oxide film.

TABLE 9

| No. | Alloy component | | | | | |
|---|---|---|---|---|---|---|
|  | Sn | Fe | Cr | Ni | O | Zr |
| 1 | 1.50 | 0.21 | 0.10 | — | 0.12 | bal. |
| 2 | 1.50 | 0.15 | 0.10 | 0.10 | 0.12 | bal. |
| 3 | 1.50 | 0.25 | 0.10 | 0.10 | 0.12 | bal. |

TABLE 10

| Heat treatment | (0001) Face | | | (1010) Face | | |
|---|---|---|---|---|---|---|
|  | Fr | Fl | Ft | Fr | Fl | Ft |
| 1100° C./10s | 0.333 | 0.333 | 0.334 | 0.333 | 0.334 | 0.333 |

Although the above channel box has a constant wall thickness, it is possible to employ another example of the channel box in which the corner portion is thicker than that of the side portion and the upper side portion becomes thinner from the lower side portion (longitudinal thickness distribution). The formation of this channel box having a thickness distribution is performed after heat treatment by chemical etching using a mixed solution of hydrogen fluoride and nitric acid after masking or by machining. In this embodiment, the outer side of the channel box is recessed; however, it is also possible for the inner side to be recessed.

The main specification of the BWR generating plant having the above configuration is shown in Table 11. In this embodiment, each member can be used without any replacement for 30 years, and also used without any replacement for 40 years in combination with periodic inspection. The reactor temperature is 288° C.; the periodic inspection is, after operation for 12 months, repeatedly carried out one time per 50 months or less, preferably, one time per 40 months or less, more preferably, one time per 30 day; the availability factor becomes 85% or more, preferably, 90% or more, more preferably, 92% or more; and the thermal efficiency becomes 35%.

EMBODIMENT 3

In this embodiment, the fuel assembly and the control rod driving mechanism identical to those in Embodiment 2 are applied to an advanced boiling water reactor (ABWR).

The reactor pressure vessel is essential equipment for a nuclear reactor plant. In the ABWR, particularly, a nozzle portion mounting an internal pump is preferably of a sleeve type so that changes in temperature and pressure generated in the reactor pressure vessel do not exert any effect on the rotational function of the internal pump and the thermal transmission to an electric motor unit is made smaller.

In-core structures reduce an effect of the internal pump exerted on vibration by fluidization. The measurement for the core flow rate is performed at a high accuracy in combination with experimental examination performed in consideration of a partial operation state of the internal pump. The flow rate of steam flowing in the turbine is measured at a high accuracy using a venturi structure provided in a main steam nozzle portion of the reactor pressure vessel. The RPV (reactor pressure vessel) constitutes a pressure boundary of a coolant and it also has a function of containing and holding the in-core structures.

The conventional RPV has an inside diameter of about 6.4 m and contains 764 pieces of the fuel assemblies, a jet pump and structures. On the other hand, in the ABWR, the RPV has an inside diameter of about 7.1 m for containing 872 pieces of the fuel assemblies and ensuring a handling space of the inner pump. Furthermore, although the related art RPV has an inner height of about 22 m, the RPV in the ABWR has an inner height of about 21 m on the basis of the following factors (a) to (d).

(a) The length of a stand pipe was shortened by adoption of a high efficiency steam separator.

(b) A limiter for limiting the dropping speed of a control rod was eliminated by adoption of FMCRD.

(c) The height of the upper cover was lowered by the change of the upper cover/main flange structure.

(d) The height of the dish-like shape of the lower end plate was lowered.

With the adoption of the inner pump, the shape of the lower end plate was changed from the conventional semi-spherical shape to a disk-like shape for ensuring a space required for installation of the inner pump onto the lower portion of the pressure vessel and in consideration of a circulating passage of cooling water. Furthermore, the internal pump was integrally formed by forging for reducing the number of welded portions.

The supporting plate was designed to have a cone barrel for ensuring a space required for handling the internal pump and for disposing a heat exchanger of the internal pump in a pedestal.

The provision of the internal pump eliminates the coolant recirculating inlet/outlet nozzles of the related art plant, so that a large diameter nozzle is not required to be disposed under a barrel core region. Accordingly, it is not required to except a large accident, such as loss of coolant.

In the conventional plant, a flow rate limiter is disposed at a trailing portion extending to a separation valve on a main steam pipe; however, in this embodiment, the flow rate limiter is disposed on a main steam nozzle so that the safety allowance for a main steam piping breakage is improved and the housing space is optimized.

The comparison in items of in-core structures between the ABWR and the BWR in Embodiment 2 is shown in Table 11.

The in-core structures in the RPV mainly function to support the core, to form a passage for coolant, and to separate hot water and steam generated in the reactor from each other; and also they are required for sufficient safety and reliability, for example, conservation of a core water injection passage for cooling water under a hypothetical accident.

TABLE 11

| Items | ABWR | BWR |
|---|---|---|
| Electric output | 1350 MW | 1100 MW |
| Thermal output of reactor | 3926 MW | 3293 MW |
| Pressure in reactor | 7.17 Mpa(73:1 kgf/cm$^2$) (abs) | 7.03 Mpa(71.7 kgf/cm$^2$) (abs) |
| Flow rate of main steam | 7480 t/h | 6410 t/h |
| Feed water temperature | 215° C. | 215° C. |
| Rated core flow rate | 52 × 10$^6$ kg/h | 48 × 10$^6$ kg/h |
| Number of fuel assemblies | 872 pieces | 764 pieces |
| Number of control rods | 205 pieces | 185 pieces |
| Core average output density | 50.5 kw/1 | 50.0 kw/1 |
| Reactor pressure vessel Inside diameter | 7.1 m | 6.4 m |
| Height | 21.0 m | 22.2 m |
| Reactor recirculating type (number of pumps) | Internal pump (10) | External recirculating pump (2) Jet pump (20) |
| Control rod driving type Normal | Electrical fine adjustment type | Hydraulic driving type |
| Scram | Hydraulic driving type | Hydraulic driving type |
| Core cooling system for emergency | Automatic pressure reduction type High pressure type (three lines) Low pressure type (three lines) | Automatic pressure reduction type High pressure type (one lines) Low pressure typy (four lines) |
| Cooling system upon shutdown of reactor | Three lines | Two lines |
| Reactor container type | Reinforced concrete lining | Steel made self-supporting type |
| Turbine type | TC6F-52 type (two-stepped re-heating) | TC6F-41/43 (non-reheating) |
| Steam separator | Double tube, three-stepped type × 349 pieces | Triple tube, two-stepped type × 225 pieces |
| Feed water spar jar, thermal sleeve | welded type double thermal sleeve | Welded type thermal sleeve |
| High pressure water injection spar jar for core | Water injection type | Spraying type |
| Low pressure water injection spar jar | Down come injection type | In-shroud injection type |
| Upper lattice plate | Integrally machining type | Lattice plate fitting type |
| Core supporting plate | Cross-reinforced beam | Parallel reinforced beam |
| In-core stabilizer | Two-stepped, fixture on shroud | One-stepped, no fixture on shroud |
| Control rod | No speed limiter Bayonet coupling type | Speed limiter, equipped Spade coupling type |
| Shroud support leg | Heighe: 21.7 inch. Ten pieces (disposed between internal pumps) | Height: 57.5 inch. 12 pieces |
| Maximum irradiation amount of neutron | 4 ~ 5 × 10$^{22}$ n/cm$^2$ | 1 × 10$^{22}$ n/cm$^2$ |
| Operating years | 30 years or more | 30 years or more |
| Average output (Availability factor) | 85% or more | 85% or more |
| Operating period | 12 months/one time | 12 months/one time |
| Operating years | 30 years or more | 30 years or more |

Table 12 shows the basic specifications regarding plant steam turbines and generators of the ABWR plant and the BWR plant. As can be seen from Table 12, the ABWR plant is a high efficiency plant improved from the BWR plant, for example, in terms of the reactor thermal power (improved by 19.2%) and the electric output (improved by 23.3%) at 50 Hz.

TABLE 12

| | | | BWR plant | |
|---|---|---|---|---|
| Item | | ABWR plant | A | B |
| 1. Reactor | Read thermal output | 3926 MW | 3923 MW | 3923 MW |
| | Feed water temperature | 215° C. | 215.5° C. | 215.5° C. |
| 2. Turbine | Type | TC6F-52 | TC6F-41 | TC6F-43 |
| | Rated electric output | 1356 MW | 1100 MW | 1137 MW |
| | Main steam pressure | 6.79 Mpa (abs) | 6.65 Mpa (abs) | 6.65 Mpa (abs) |
| | Rotational number | 1500 r/min | 1500 r/min | 1800 r/min |
| 3. Condenser | Rated vacuum degree | 5.07 kpa (abs) | 5.07 kpa (abs) | 5.07 kpa (abs) |
| | Cooling pipe material | Titanium | Titanium | Titanium |
| | Internal heater | Low pressure, four units | Low pressure, four units | Low pressure, four units |
| 4. Moisture separating/ heating device | Type | Two-stepped, re-heating type | Non-reheating type | Two-stepped, re-heating type |
| 5. Main steam system | Introduction of main steam | Side entry | Front entry | Front entry |
| 6. Condensed water feed | Feed water pump | TDRFP × 2 units MDRFP × one unit | TDRFP × 2 units MDRFF × 2 unit | TDRFP × 2 units MDRFP × 2 pieces |
| | Heater drain | Pump up | Cascade | Cascade |
| 7. Power generator | Type | TELQQ · KD | TELQQ · KD | TELQQ · KD |
| | Reated output | 1540 MVA | 1300 MVA | 1280 MVA |
| | Number of electrodes | 4 | 4 | 4 |
| | Power factor | 0.9 | 0.9 | 0.9 |

ABWR (advanced boiling water reactor);
BWR (boiling water reactor);
TDRPF (turbine driven feed pump);
MDRFP (motor driven feed pump)

In this embodiment, the service life, period of routine inspection, availability factor and thermal efficiency comparable to those in Embodiment 2 can be obtained.

What is claimed is:

1. A control rod driving apparatus comprising a housing, a hollow piston provided in said housing, a driving piston for vertically driving said hollow piston, rollers provided on a tube between said hollow piston and the tube, and pins functioning as rotating shafts of said rollers, wherein each of said roller and said pin is made of an iron-based or a nickel-based alloy having such a wear characteristic that the total wear amount of said roller and said pin is within a range of 10 mg or less per unit area (sliding width 7.5 mm×sliding distance 1 km) in a wear test performed under a load of 1 kg per sliding width of 0.75 mm in water at a high temperature of 288° C.

2. A control rod driving apparatus comprising a housing, a hollow piston provided in said housing, a driving piston for vertically driving said hollow piston, rollers provided on a tube between said hollow piston and the tube, and pins functioning as rotating shafts of said rollers, wherein said roller is made of an iron-based or a nickel-based alloy having such a wear characteristic that the wear amount of said roller is within a range of 8.5 mg or less per unit area (sliding width 7.5 mm×sliding distance 1 km) in a wear test relative to said pin performed under a load of 1 kg per sliding width of 0.75 mm in water at a high temperature of 288° C.

3. A control rod driving apparatus comprising a housing, a hollow piston provided in said housing, a driving piston for vertically driving said hollow piston, rollers provided on a tube between said hollow piston and the tube, and pins functioning as rotating shafts of said rollers, wherein said pin is made of an iron-based or a nickel-based alloy having such a wear characteristic that the wear amount of said pin is within a range of 4.5 mg or less per unit area (sliding width 7.5 mm×sliding distance 1 km) in a wear test relative to said roller performed under a load of 1 kg per sliding width of 0.75 mm in water at a high temperature of 288° C.

4. A nuclear reactor comprising a control rod driving apparatus defined in any one of claims 1 to 3.

5. A control rod driving apparatus comprising a housing, a hollow piston provided in said housing, a driving piston for vertically driving said hollow piston, rollers provided on a tube between said hollow piston and the tube, and pins functioning as rotating shafts of said rollers, wherein each of said rollers is made of a wear resisting sintered alloy comprising an iron-based or nickel-based alloy forming a soft matrix and non-precipitated and non-crystallized hard particles dispersed in said soft matrix, wherein said hard particles are broken into fine particles by sliding wear and the fine particles are dispersed on a wear surface and also buried in said soft matrix.

6. A control rod driving apparatus comprising a housing, a hollow piston provided in said housing, a driving piston for vertically driving said hollow piston, rollers provided on a tube between said hollow piston and the tube, and pins functioning as rotating shafts of said rollers, wherein each of said rollers is made of a wear resisting sintered alloy comprising a soft matrix having a hardness of from 100 to 300 Hv and hard particles, having an average particle size of from 10 to 120 µm, dispersed in said soft matrix in an amount of from 5 to 30 vol %.

7. A control rod driving apparatus comprising a housing, a hollow piston provided in said housing, a driving piston for vertically driving said hollow piston, rollers provided on a tube between said hollow piston and the tube, and pins functioning as rotating shafts of said rollers, wherein each of said rollers is made of a wear resisting sintered alloy comprising an iron-based or nickel-based alloy containing chromium in an amount of from 15 to 30 wt % and hard particles, having a hardness of from 1000 to 2000 Hv, dispersed in said alloy.

8. A control rod driving apparatus comprising a housing, a hollow piston provided in said housing, a driving piston for vertically driving said hollow piston, rollers provided on a tube between said hollow piston and the tube, and pins functioning as rotating shafts of said rollers, wherein each of said rollers is made of a wear resisting sintered alloy comprising an iron-based or nickel-based alloy containing chromium in an amount of from 15 to 30 wt % and hard particles, having an average particle size of from 10 to 120 µm, dispersed in said alloy.

9. A control rod driving apparatus comprising a housing, a hollow piston provided in said housing, a driving piston for vertically driving said hollow piston, rollers provided on a tube between said hollow piston and the tube, and pins functioning as rotating shafts of said rollers, wherein each of said rollers is made of a wear resisting sintered alloy comprising an iron-based or nickel-based alloy containing chromium in an amount of from 15 to 30 wt % and non-precipitated or non-crystallized particles of one or more kinds of carbides or nitrides, having a hardness of from 1000 to 2000 Hv, dispersed in said alloy.

10. A control rod driving apparatus comprising a housing, a hollow piston provided in said housing, a driving piston for vertically driving said hollow piston, rollers provided on a tube between said hollow piston and the tube, and pins functioning as rotating shafts of said rollers, wherein each of said rollers is made of a wear resisting sintered alloy comprising an iron-based or nickel-based alloy containing chromium in an amount of from 15 to 30 wt % and particles of one or more kinds of chromium carbides and chromium nitrides, having an average particle size of from 10 to 120 µm, dispersed in said alloy.

11. A nuclear reactor comprising a control rod driving apparatus defined in any one of claims 5 to 10.

12. A roller for a control rod driving apparatus, which is made of a wear resisting sintered alloy comprising an iron-based or nickel-based alloy forming a soft matrix and non-precipitated and non-crystallized hard particles dispersed in said soft matrix, wherein said hard particles are broken into fine particles by sliding wear and the fine particles are dispersed on a wear surface and also buried in said soft matrix.

13. A roller for a control rod driving apparatus, which is made of a wear resisting sintered alloy comprising a soft matrix having a hardness of from 100 to 300 Hv and hard particles, having an average particle size of from 10 to 120 µm, dispersed in said soft matrix in an amount of from 5 to 30 vol %.

14. A roller for a control rod driving apparatus, which is made of a wear resisting sintered alloy comprising an iron-based or nickel-based alloy containing chromium in an amount of from 15 to 30 wt % and hard particles, having a hardness of from 1000 to 2000 Hv, dispersed in said alloy.

15. A roller for a control rod driving apparatus, which is made of a wear resisting sintered alloy comprising an iron-based or nickel-based alloy containing chromium in an amount of from 15 to 30 wt % and hard particles, having an average particle size of from 10 to 120 µm, dispersed in said alloy.

16. A roller for a control rod driving apparatus, which is made of a wear resisting sintered alloy comprising an iron-based or nickel-based alloy containing chromium in an amount of 15 to 30 wt % and non-precipitated or non-crystallized particles of one or more kinds of carbides or nitrides, having a hardness of from 1000 to 2000 Hv, dispersed in said alloy.

17. A roller for a control rod driving apparatus, which is made of a wear resisting sintered alloy comprising an iron-based or nickel-based alloy containing chromium in an amount of 15 to 30 wt % and particles of one or more kinds of chromium carbides and chromium nitrides, having an average particle size of from 10 to 120 µm, dispersed in said alloy.

* * * * *